United States Patent
Kalina

(10) Patent No.: US 12,523,190 B2
(45) Date of Patent: Jan. 13, 2026

(54) EVAPORATIVE EMISSIONS CANISTER WITH LIQUID-FUEL-RESISTANT ADSORBENT

(71) Applicant: PHINIA Jersey Holdings LLC, Wilmington, DE (US)

(72) Inventor: Andrzej Kalina, Wieliczka (PL)

(73) Assignee: PHINIA Jersey Holdings LLC, Wilmington, DE (US)

( * ) Notice: Subject to any disclaimer, the term of this patent is extended or adjusted under 35 U.S.C. 154(b) by 0 days.

(21) Appl. No.: 18/652,210

(22) Filed: May 1, 2024

(65) Prior Publication Data

US 2025/0341194 A1     Nov. 6, 2025

(51) Int. Cl.
F02M 25/08     (2006.01)

(52) U.S. Cl.
CPC ............... *F02M 25/0854* (2013.01)

(58) Field of Classification Search
CPC .................................. F02M 25/0854
USPC ....................................... 123/519
See application file for complete search history.

(56) References Cited

U.S. PATENT DOCUMENTS

| | | |
|---|---|---|
| 4,714,485 A | 12/1987 | Covert et al. |
| 5,119,791 A | 6/1992 | Gifford et al. |
| RE38,844 E | 10/2005 | Hiltzik et al. |
| 9,732,649 B2 | 8/2017 | Hiltzik et al. |
| 10,280,820 B2 | 5/2019 | Hiltzik et al. |
| 10,323,553 B2 | 6/2019 | Hiltzik et al. |
| 10,422,261 B2 | 9/2019 | Hiltzik et al. |
| 10,960,342 B2 | 3/2021 | Hiltzik et al. |
| 11,867,140 B1 | 1/2024 | Osmeda et al. |
| 2019/0390585 A1 | 12/2019 | Hiltzik et al. |
| 2021/0170324 A1 | 6/2021 | Hiltzik et al. |
| 2024/0207813 A1* | 6/2024 | Hiltzik ............... B01J 20/20 |

FOREIGN PATENT DOCUMENTS

EP     2738378 A1     6/2014

* cited by examiner

*Primary Examiner* — Scott A Reinbold
(74) *Attorney, Agent, or Firm* — WARNER NORCROSS + JUDD LLP

(57) ABSTRACT

An evaporative emissions (fuel vapor) canister is provided. The canister includes a casing defining an internal volume therein, and the casing includes an inlet in fluid communication with the internal volume. The internal volume includes a bed of a first adsorbent material adjacent the inlet, and a bed of a second adsorbent material separated from the inlet by the bed of the first adsorbent material. The first adsorbent material is resistant to liquid fuel, and the second adsorbent material is different than the first adsorbent material. Liquid fuel that enters the internal volume of the casing via the inlet is adsorbed by the first adsorbent material such that the first adsorbent material protects the second adsorbent material from the liquid fuel. The first adsorbent material is thereby protected from damage by the liquid fuel. A method of making an evaporative emissions canister is also provided.

3 Claims, 3 Drawing Sheets ns EVAPORATIVE EMISSIONS CANISTER WITH LIQUID-FUEL-RESISTANT ADSORBENT

FIELD OF THE INVENTION

The disclosure generally relates to evaporative emissions canisters for adsorption of fuel vapors in fuel powered automotive vehicles.

BACKGROUND OF THE INVENTION

Evaporative loss of fuel vapor generated within fuel tanks of the fuel systems of motor vehicles powered by internal combustion engines is a potential contributor to atmospheric air pollution by hydrocarbons. Canister systems that employ activated carbon to adsorb the fuel vapor emitted from the fuel systems are used to limit such evaporative emissions from the fuel tanks of gasoline-fueled automotive vehicles. A typical evaporative emissions canister includes a casing inside of which a gas passage is formed and filled with activated carbon as a fuel vapor adsorbent. Charge (inlet) and purge (outlet) ports for fuel vapor are communicated with one end of the gas passage, while a vent port (air vent) is communicated with the other end of the gas passage, thus allowing for charging and purging of the canister. During stoppage of the vehicle (e.g., when parked), fuel vapor generated from the fuel in the fuel tank is introduced through the charge port into the canister and adsorbed by the adsorbent. During operation of the engine, atmospheric air is periodically introduced through the atmospheric port to purge the fuel vapor in the canister by desorbing fuel vapor that was adsorbed in the adsorbent. The flow of air carries the purged fuel vapor to an intake system of the engine through the purge port so that the fuel vapor can be combusted within the engine, thus accomplishing a purging of the canister. By the desorption of fuel vapor during purging, the carbon adsorbent is regenerated and a fuel vapor adsorbing performance of the canister is revived, thereby allowing the adsorbent to repeatedly adsorb fuel vapor during periods of non-use of the engine.

Typical evaporative emissions canisters commonly use high-capacity adsorbents (e.g., certain carbon adsorbents having high butane working capacity (BWC)) at the charge side of the canister and lower capacity adsorbents (e.g., other carbon adsorbents having lower BWC) on the vent port side of the canisters. Thus, the effective and nominal BWC of the adsorbents may decrease along the flow path from the fuel tank connection (charge port) to the air connection (vent port). Such carbon arrangements provide the required capacity to capture hydrocarbons released from the fuel tank and demonstrate low bleed emissions due to the lower capacity adsorbents being used on the air side of the canister. Since evaporative emissions canisters store fuel vapors generated from evaporation of fuel in the fuel tank, the typical hydrocarbons adsorbed in the canisters are the fuel component compounds having lower molecular mass and higher volatility. Higher molecular mass and lower volatility compounds are also present in fuel; however, since they do not evaporate readily, the amount of these so-called heavy hydrocarbon compounds that reach evaporative emissions canisters is limited. At the same time, such heavier hydrocarbons are better adsorbed by the evaporative emissions canisters than highly volatile compounds. Therefore, evaporative emissions canisters tend to accumulate heavier compounds as the so-called "heel" when exposed to fuel vapors for long periods of time. For example, ethanol, methanol, and other oxygenates and additives demonstrate high affinity to activated carbons, and they can create a heel in the carbon adsorbent bed of the canister that is resistant to canister purge and regeneration. The presence of the heel thus reduces the working capacity of canisters and can result in canister breakthrough and failure to meet emission control requirements. This is becoming of increasing importance as more renewable fuels (e.g., ethanol) are being introduced to meet environmental regulations.

Further, under certain operating conditions, liquid fuel may be transferred from a fuel system into an evaporative emissions canister. Liquid fuel transport from a fuel tank to an evaporative emissions canister is a challenge in fuel system designs because in contrast to fuel vapor compositions, higher boiling compounds are present in the liquid fuel and they can constrain canister capacity long term. When liquid fuel from a fuel tank reaches an evaporative emissions canister, a significant amount of heavy compounds may be adsorbed in the carbon adsorbent, especially close to the charge inlet. The presence of liquid fuel, including heavy compounds, oxygenates, and additives, can significantly reduce the storage capacity of the evaporative emissions canister. Also, some liquid fuels can damage the carbon adsorbent. For example, intrusion of liquid fuel containing high concentrations of oxygenates (e.g., ethanol, methanol) into an evaporative emissions canister can break pellets of carbon adsorbent. An evaporative emissions canister with broken pellets in turn exhibits a significant increase in air flow restriction in comparison to a canister with undamaged carbon pellets. The increase in flow restriction may result in catastrophic failure of the canister and fuel system issues because vapor venting of the canister is blocked and excessive vapor pressure builds inside the fuel tank. Also, such a damaged fuel system may not be capable of refueling due to the overall high flow restriction of the system and its venting path.

To address the issue of liquid fuel entry/contamination into an evaporative emissions canister, some canisters incorporate a liquid fuel trap to keep liquid fuel from being carried into the adsorbent bed. One type of liquid fuel trap relies upon gravity, but these traps require additional components and assembly operations that increase system cost and complexity. Also, these liquid trap components create additional potential leak paths as well as a source of contamination because a welding operation may be required for assembly. Further, the capacity of a liquid trap is limited, requiring the trap to be periodically emptied to prevent overfilling and subsequent exposure of the canister adsorbent bed to the liquid fuel. The liquid trap is usually emptied when an evaporative emissions canister is purged, either by the liquid fuel being evaporated or sucked away from the liquid trap. Moreover, it is not always possible to incorporate a liquid trap into an evaporative emissions canister due to space restrictions, canister orientation, and/or assembly constraints. Therefore, a need continues to exist for improved ways to limit or prevent evaporative emissions canister damage due to contamination with liquid fuel.

BRIEF SUMMARY

An improved evaporative emissions canister is provided. The evaporative emissions canister includes a casing defining an internal volume therein. The casing includes an inlet in fluid communication with the internal volume. The internal volume includes a bed of a first adsorbent material adjacent the inlet, and a bed of a second adsorbent material separated from the inlet by the bed of the first adsorbent material. The first adsorbent material is resistant to liquid fuel, and the second adsorbent material is different than the first adsorbent material. Liquid fuel that enters the internal volume of the casing via the inlet is adsorbed by the first adsorbent material, the liquid fuel does not damage the first adsorbent material, and the first adsorbent material protects the second adsorbent material from the liquid fuel.

In specific embodiments, the second adsorbent material is not resistant to liquid fuel.

In specific embodiments, the volume of the bed of first adsorbent material is in a range of 100 to 200 $cm^3$.

In specific embodiments, the first adsorbent material has a butane working capacity (BWC) of less than 12 ASTM BWC.

In specific embodiments, the first adsorbent material has an apparent density above 0.35 $g/cm^3$.

In specific embodiments, the first adsorbent material has micropores in an amount less than 0.5 $cm^3/g$, micropores being pores having a size of less than 2 nm.

In specific embodiments, the bed of first adsorbent material contacts the bed of second adsorbent material. In other embodiments, the bed of first adsorbent material is spaced from the bed of second adsorbent material.

A fuel vapor canister for adsorbing fuel evaporated in a fuel tank of an automotive vehicle is also provided. The fuel vapor canister includes a casing forming a main body defining at least one chamber therein. A charge port is disposed in the main body. The charge port is in fluid communication with the fuel tank of the vehicle for receiving fuel vapor from the fuel tank. The at least one chamber includes a bed of first adsorbent material and a bed of second adsorbent material. The first adsorbent material is resistant to liquid fuel. The bed of first adsorbent material is disposed between the charge port and the bed of second adsorbent material.

In specific embodiments, the bed of first adsorbent material is adjacent the charge port.

In specific embodiments, the bed of first adsorbent material is a layer of first adsorbent material, and the bed of second adsorbent material is a separate layer of second adsorbent material.

In particular embodiments, the layer of first adsorbent material contacts the layer of second adsorbent material.

In particular embodiments, the layer of first adsorbent material is spaced from the layer of second adsorbent material by a separator.

In certain embodiments, the separator is one of a layer of foam, a layer of fleece, a filter, a partition, or a volume compensation plate.

In specific embodiments, the bed of first adsorbent material is contained within a cartridge, and the cartridge is inserted into the at least one chamber.

A method of making an evaporative emissions canister is also provided. The method includes providing a casing having an internal volume, the casing including an inlet in fluid communication with the internal volume. The method further includes disposing, within the internal volume, a bed of first adsorbent material adjacent to the inlet. The method further includes disposing, within the internal volume, a bed of a second adsorbent material in a position that is separated from the inlet by the bed of the first adsorbent material. In the method, the first adsorbent material is resistant to liquid fuel, and the second adsorbent material is different than the first adsorbent material. The first adsorbent material forms a protective barrier that protects the second adsorbent material from liquid fuel.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

Figure 1:
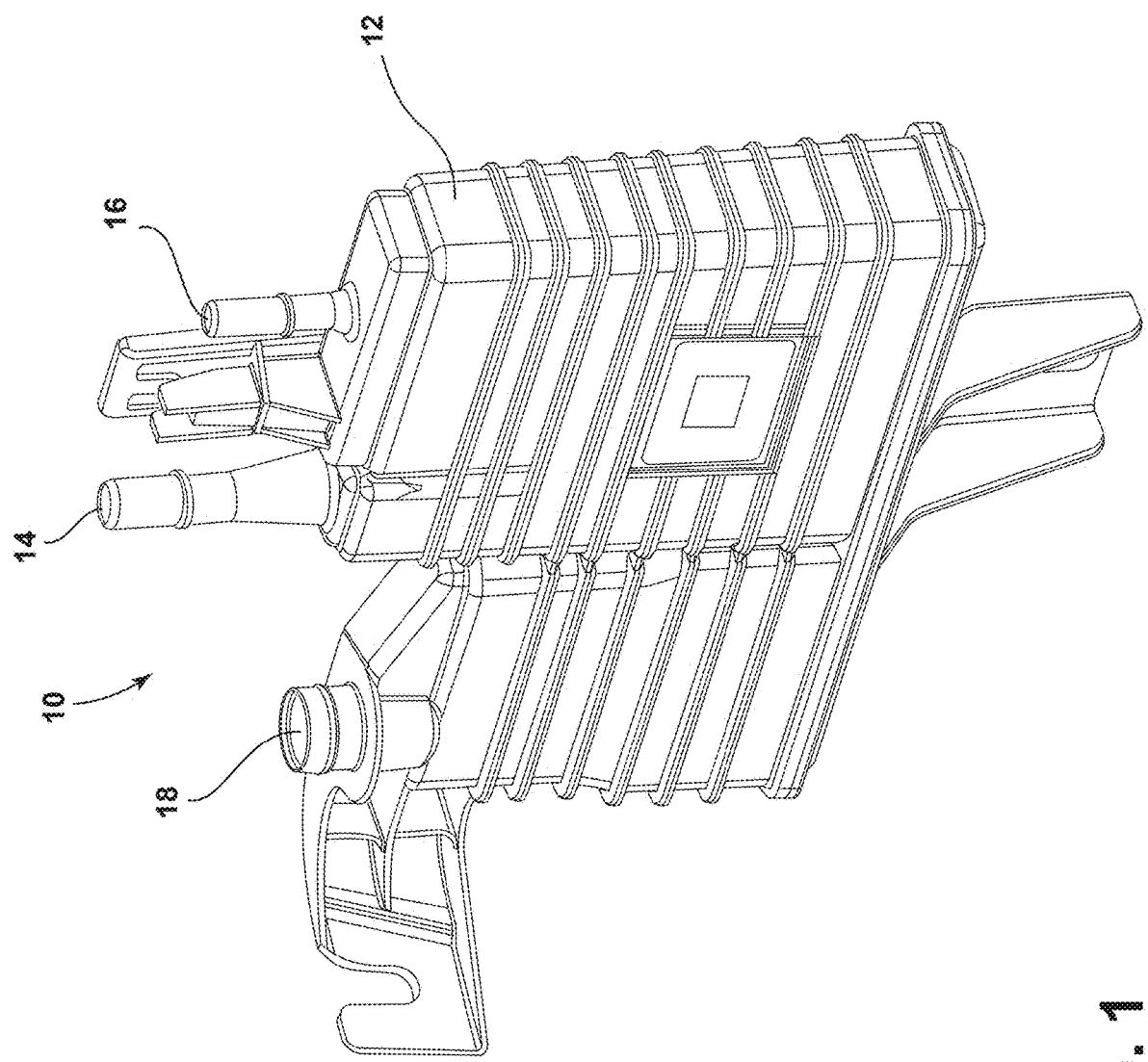
FIG. 1 is a perspective view of an exemplary evaporative emissions canister in accordance with embodiments of the disclosure.
Figure 2:
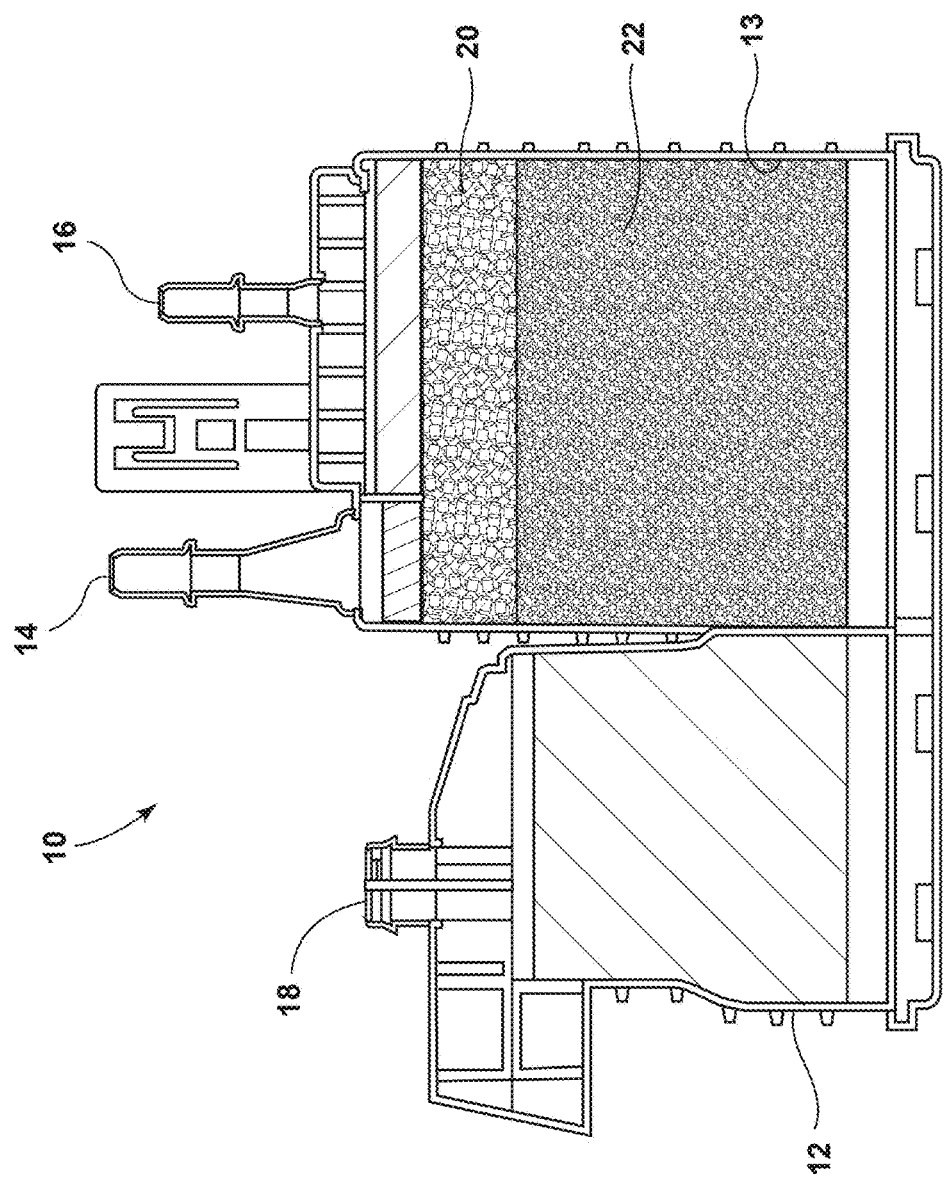
FIG. 2 is sectional view of the evaporative emissions canister of FIG. 1 showing the internal volume of the canister.
Figure 3:
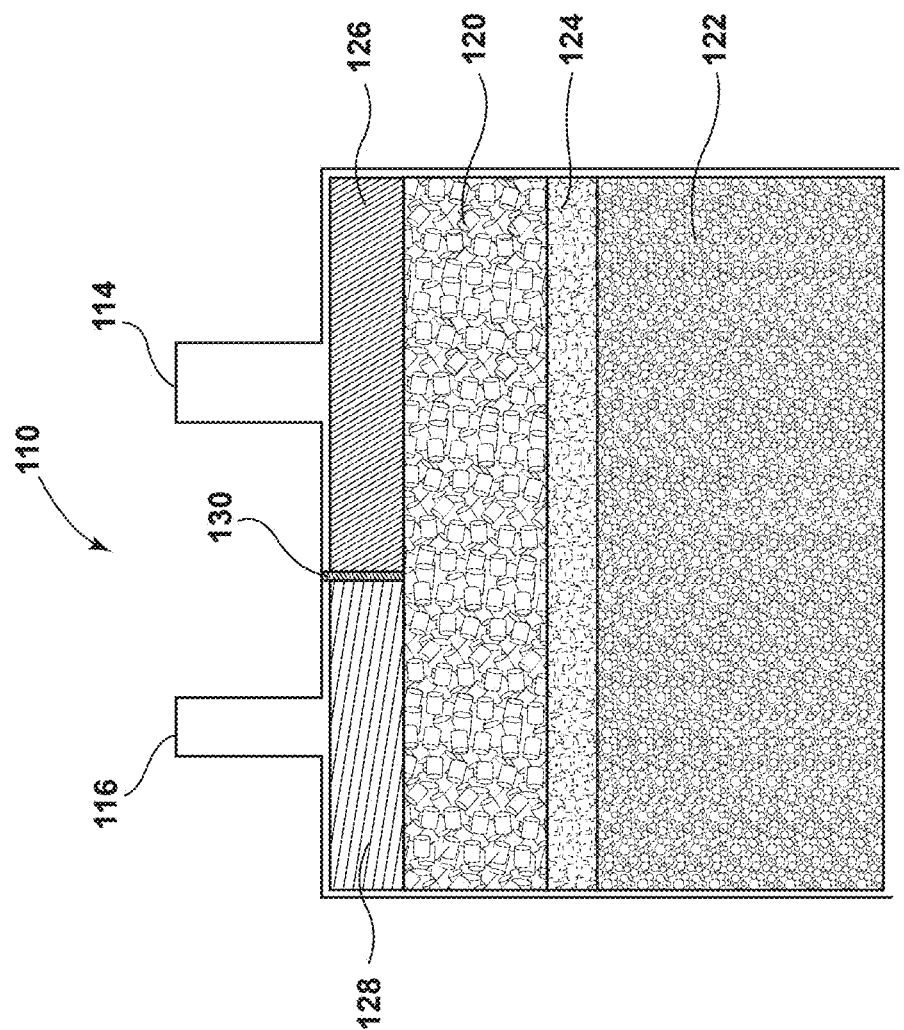
FIG. 3 is a schematic view of an evaporative emissions canister in accordance with certain embodiments of the disclosure.

An evaporative emissions canister is provided. Referring to FIGS. 1-3, wherein like numerals indicate corresponding parts throughout the several views, the evaporative emissions canister is illustrated and generally designated as a fuel vapor canister 10 for a fuel tank of a vehicle fuel system that pumps liquid fuel, by way of non-limiting example gasoline fuel, from the fuel tank (not shown) to an internal combustion engine (not shown) that powers an automotive vehicle. The fuel vapor canister 10 traps fuel vapors that arise in the fuel tank during periods of non-use of the internal combustion engine due to, for example, daily variations in ambient temperatures. The fuel vapor canister 10 exhibits improved compatibility with liquid fuel, thereby protecting against damage to the adsorbents contained in the canister that could otherwise be caused by liquid fuel entering the canister.

FIGS. 1 and 2 generally depict a fuel vapor canister 10 used in a vehicle fuel system. The fuel vapor canister 10 includes a casing 12 that forms a main body of the canister 10. The casing 12 defines an internal volume 13 within the main body. The internal volume may be one single chamber inside the canister, or may be partitioned into a plurality of chambers, and any of the chambers may be further partitioned into two or more sub-chambers. The casing 12 has at least one inlet and outlet in fluid communication with the internal volume 13 of the casing 12. Particularly, the casing 12 has a charge port 14, a purge port 16, and a vent port 18. The charge port 14 and purge port 16 are disposed at one end of the internal volume 13 of the casing 12, while the vent port 18 is disposed at an opposite end so that there may be fluid flow between the charge port 14 and the vent port 18 or between the vent port 18 and the purge port 16, depending on whether the canister 10 is in a charging or purging mode. The charge port 14 is connected to and in fluid communication with the vehicle fuel tank via a conduit or similar, while the vent port 18 is open to the atmosphere for venting the canister 10 and for admission of purge air. The purge port 16 is connected to and in fluid communication with an air intake system of the engine via a conduit or similar. As described in greater detail below, when the internal combustion engine is not operating, fuel vapors generated in the fuel tank travel through the charge port 14 and into the internal volume 13 of the casing 12. The fuel vapors become trapped in the canister casing 12, while air exits the casing 12 through the vent port 18. When the internal combustion engine is running, air is occasionally drawn into the canister 10 through the vent port 18, and the trapped fuel vapors are expelled from the casing 12 through the purge port 16 into the air intake system of the internal combustion engine to be combusted with the fuel/air mixture. Thus, the charge port 14 is an inlet and the purge port 16 is an outlet, while the vent port 18 may be an outlet or an inlet depending on the operation of the canister 10 (charging versus purging) and the associated direction of flow. A fluid flow path thereby extends from the charge port 14 through the internal volume 13 of the casing 12 to the vent port 18 in one operational mode of the canister 10, and from the vent port 18 through the internal volume 13 of the casing 12 to the purge port 16 in another operational mode of the canister 10.

The internal volume 13 of the casing 12 contains therein a plurality of different adsorbent materials. Particularly, a bed of a first, liquid-fuel resistant adsorbent material 20 that is resistant to liquid fuel is disposed adjacent to the charge (inlet) port 14. As used herein, adjacent means the bed of first adsorbent material 20 is directly next to, or in close proximity to, or neighbors the charge port 14 without any other fuel vapor adsorbent material being disposed between the first adsorbent material 20 and the charge port 14. It is possible, however, that there may be void space between the charge port 14 and the first adsorbent material 20, or there may be some other material between the charge port 14 and the first adsorbent material 20 such as a filter. The first adsorbent material being resistant to liquid fuel means that the first adsorbent material withstands being damaged, degraded, or otherwise altered in its structural integrity or functionality when contacted with liquid fuel, such as but not limited to cracking and/or reduction in fuel vapor adsorption capability. The first adsorbent material 20 thus forms a protective barrier between the charge port 14 and the other adsorbent material(s) that are contained within the casing 12. As such, a bed of a second adsorbent material 22 contained in the internal volume 13 is spaced from the charge port 14 with the first adsorbent material 20 being disposed between the charge port 14 and the second adsorbent material 22. The second adsorbent material 22 is different than the first adsorbent material 20, and hence may or may not be resistant to liquid fuel. Because the first adsorbent material 20 provides a protective barrier that safely adsorbs the liquid fuel and prevents it from reaching the second adsorbent material 22 or beyond, the second adsorbent material 22 need not be resistant to liquid fuel. The volume of the bed of first adsorbent material 20 necessary to provide a sufficient liquid-fuel-protective barrier is in the range of 50 to 400 cm$^3$, or optionally in the ranges of 75 to 400 cm$^3$, 100 to 400 cm$^3$, 100 to 350 cm$^3$, 100 to 300 cm$^3$, 100 to 250 cm$^3$, 100 to 200 cm$^3$, 200 to 400 cm$^3$, 250 to 400 cm$^3$, 300 to 400 cm$^3$, or 150 to 250 cm$^3$.

The first adsorbent material 20 is preferably an activated carbon having a low to medium working capacity, such as a butane working capacity (BWC) of less than 12 ASTM BWC as measured, for example, according to ASTM D5228, which is incorporated herein by reference in its entirety. A low working capacity is considered to be below 10 ASTM BWC, and a medium working capacity is considered to be between 10 and 12 ASTM BWC. In contrast, typical conventional evaporative emissions canisters have a high-capacity carbon adsorbent adjacent the fuel tank vapor inlet, with the high working capacity being between 15 and 17 ASTM BWC. The lower working capacity of the first adsorbent material 20 limits the amount of heat that is released during the adsorption of liquid fuels, thus less vapor and pressure is generated and built up inside of the carbon pores, thereby providing a higher resistance to cracking caused by liquid fuel. The first adsorbent material 20 also may have an apparent density above approximately 0.35 g/cm$^3$, the apparent density being measured, for example, according to ASTM D2854, which is incorporated herein by reference in its entirety. Further, the amount of micropores present in the first adsorbent material 20 is limited and may be less than approximately 0.5 g/cm$^3$ as determined by DFT (density functional theory) analysis, micropores being defined as pores less than approximately 2 nm in size.

In many embodiments, the first adsorbent material 20 is a pellet carbon in order to maintain an overall canister flow restriction that is low; however, the first adsorbent material 20 instead may be a granular carbon. Alternatively, the first adsorbent material 20 may be a zeolite, alumina, or similar, which also exhibit a good adsorption of liquids, a high resistance to cracking, and a low working capacity. In the case of activated carbon adsorbents, the manufacturing process of the activated carbon adsorbent, especially activated pellet carbon, may be a significant factor enabling its liquid-fuel resistance, whereas the choice of carbon raw material may not be significant. In particular, a first manufacturing process in which the carbon raw material is activated with a catalyst (e.g., phosphoric acid), then subjected to post-processing (washing, drying, etc.), followed by grinding or milling of the activated material, then adding a binder, mixing, and shaping the mixture into pellet or granular form, provides a material with improved resistance to liquid fuel. This may be due to better control of the binder (which in this case may be an inorganic material of higher density and heat capacity) and binding properties, as well as lower initial stress inside of the activated material. Addition of the binder to the activated material may result in dilution of the activated material and thus a lower working capacity. The higher density of the binder in turn increases the apparent density of the activated material. Also, the presence of an inorganic binder of relatively high heat capacity may mitigate thermal effects within the carbon material and help retain material integrity. On the other hand, a second manufacturing process in which the raw carbon material is mixed with binder and catalyst, then shaped into pellet form followed by final activation and post-processing, does not usually work to obtain a liquid-fuel-resistant activated carbon adsorbent. By way of example, the following table summarizes the comparison of the formation of various carbon raw materials into pellets by the two manufacturing processes and their resulting properties. Carbon raw materials were activated and formed into pellets by either the first or second manufacturing process described above, and then tested with liquid fuel by introducing drops of 95% ethanol to the pellets and observing the pellets under a microscope for the presence of cracks. In the table, samples A1-A2 were wood-based activated carbons, sample B1 was an olive-pit-based activated carbon, and samples C1-C5 were hardwood-based activated carbons. More specifically, and by way of example only, the raw material for sample A1 was KMAZ 2 obtained from Fujian Xinsen Carbon Co., Ltd., the raw material for sample A2 was KMAZ 3 obtained from Fujian Xinsen Carbon Co., Ltd., the raw material for sample B1 was CNR115LB obtained from Carbon Norit UK Limited, the raw material for sample C1 was BAX1100LD obtained from Ingevity Corp., the raw material for sample C2 was BAX1500 obtained from Ingevity Corp., the raw material for sample C3 was BAX1700 obtained from Ingevity Corp., the raw material for sample C4 was BAX1100 obtained from Ingevity Corp., and the raw material for sample C5 was BAX LBE obtained from Ingevity Corp.

TABLE 1

Comparison of Liquid-Fuel Resistance of Activated Carbon Pellets

| Activated Carbon Sample[1] | Form | BWC[2] | Apparent Density[3] | Manufacturing Process[4] | Cracks? |
|---|---|---|---|---|---|
| A1 | 2 mm pellet | 11.7 | 0.31 | 2 | YES |
| A2 | 2 mm pellet | 14.9 | 0.27 | 2 | YES |
| B1 | 2.5 mm pellet | 12.0 | 0.36 | 2 | YES |
| C1 | 2.2 mm pellet | 11.7 | 0.32 | 2 | YES |
| C2 | 2 mm pellet | 15.2 | 0.28 | 2 | YES |
| C3 | 2 mm pellet | 17.1 | 0.29 | 2 | YES |
| C4 | 2 mm pellet | 11.6 | 0.36 | 1 | NO |
| C5 | 2 mm pellet | 6.3 | 0.37 | 1 | NO |

[1] Various raw materials (A, B, C) used for activated carbon manufacturing
[2] According to ASTM D5228
[3] According to ASTM D2854
[4] Manufacturing process:
"1" = activation of raw material with catalyst → post-processing → grinding/milling → mixing with binder → shaping into pellets → post-processing;
"2" = raw material mixing with catalyst and binder → pellet shaping → activation → post-processing The higher the micropore volume content of activated carbon, the greater the thermal effects of vapor adsorption and condensation. High micropore content in the activated carbon also increases the specific surface area and thus reduces the structural integrity of the material. Thus, as illustrated by way of example in the following table, the micropore volume content of the liquid-fuel-resistant adsorbent material 20 is preferably low, such as below 0.5 cm$^3$/g.

TABLE 2

Comparison of Pore Structure and Liquid-Fuel Resistance of Activated Carbon Pellets

| Activated Carbon Sample | Apparent Density[1] | Micropore Volume[2] | Micropore SSA[3] | Cracks? |
|---|---|---|---|---|
| A1 | 0.31 | 0.711 | 1017 | YES |
| B1 | 0.36 | 0.750 | 1037 | YES |
| C1 | 0.32 | 0.544 | 619 | YES |
| C5 | 0.37 | 0.218 | 496 | NO |

[1] According to ASTM D2854
[2] Micropore (<2 nm) volume, cm$^3$/g
[3] SSA: specific surface area, m$^2$/g (pores <2 nm)

The second adsorbent material 22, and any other adsorbent material contained within the internal volume 13 of the canister 12, may be any other adsorbent material different (in composition and/or properties) than the first adsorbent material 20 described above. By way of example, the second adsorbent material 22 and any other adsorbent material in the canister may be an activated pellet carbon, an activated granular carbon, or other types or forms of adsorbents such as spherical, honeycomb, cylindrical, structured media of an extruded, wound, folded, pleated, corrugated, bonded, or poured form, sheets, foams, and the like. The volume of the second adsorbent material 22 and/or the volume of the second adsorbent 22 and any other adsorbent material in the canister is significantly larger than the volume of the first, liquid-fuel-resistant adsorbent material 20 in the canister. For example, the total adsorbent volume in the canister may be in the range of 1 to 4 liters (1,000 to 4,000 cm$^3$), and as described above, the volume of the first adsorbent material 20 may be, for example, in the range of 100 to 200 cm$^3$. Thus, the volume of the second adsorbent material 22 and/or the volume of the second adsorbent material and any other adsorbent material in the canister may be 5 to 10 times or more (e.g., 15 times, 20 times, 25 times, 30 times, 35 times, 40 times) the volume of the first adsorbent material 20.

With reference to FIGS. 2 and 3, in some embodiments, the bed of first adsorbent material 20 is a layer of the first adsorbent material, and the bed of second adsorbent material 22 is a separate layer of the second adsorbent material. Further, as shown in FIG. 2, the layer of first adsorbent material 20 may be in contact with the layer of second adsorbent material 22. In other embodiments of the canister 110 as shown in FIG. 3, the layer of first adsorbent material 120 instead may be spaced from and thus not in contact with the layer of second adsorbent material 122. For example, the layer of first adsorbent material 120 may be spaced from the layer of second adsorbent material 122 by a separator 124. The separator is not particularly limited, and may be, for example, a layer of foam, a layer of fleece, a filter, a partition (such as a perforated partition plate), or a volume compensation plate. In other alternatives, the first adsorbent material may be contained within a cartridge, the internal volume of which functions as a sub-chamber, and the cartridge may be inserted into the internal volume, such as a chamber of the internal volume, of the canister at a position that is adjacent, in proximity to, and/or neighboring the fuel vapor inlet to the canister. The cartridge may be perforated to allow for the flow of gas into and through, and the entry of liquid within, the internal volume of the cartridge containing the first adsorbent material. Further, a filter material 126 may be disposed between the charge port 114 and the first adsorbent material 120, and another filter material 128 may be disposed between the purge port 116 and the first adsorbent material 120. The filter material 126 and the filter material 128 may be formed of the same material with identical construction and properties (e.g., filtration properties), or the two filters may differ, depending on the requirements for the system. A buffer wall 130 may separate the two filter materials 126, 128 to reduce or prevent communication (cross-talk) between the two ports 114, 116. However, if the filter material 126 is the same as the filter material 128, the buffer wall 130 may be eliminated, in which case the filter material 126 and the filter material 128 may be combined into one larger filter.

Advantageously, the present first adsorbent material effectively adsorbs liquid fuel that undesirably contaminates the evaporative emissions canister from the fuel tank via the charge port. The first adsorbent material is not damaged if contacted with liquid fuel, and by preventing further travel of the liquid fuel, the first adsorbent material protects the other adsorbent material(s) present within the canister from damage. The first adsorbent material thereby provides a simpler and easier to manufacture alternative to conventional liquid fuel trap structures.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

What is claimed is:

1. An evaporative emissions canister comprising:
   a casing defining an internal volume therein;
   the casing including an inlet in fluid communication with the internal volume; and
   the internal volume including a bed of a first adsorbent material adjacent the inlet, and a bed of a second adsorbent material separated from the inlet by the bed of the first adsorbent material, the volume of the bed of first adsorbent material being in a range of 100 to 200 $cm^3$, and the volume of the second adsorbent material being at least 5 times the volume of the first adsorbent material;
   wherein the first adsorbent material is resistant to structural damage or functional degradation caused by liquid fuel, the structural damage being cracking, and the functional degradation being reduced fuel vapor adsorption capacity, the first adsorbent having a butane working capacity (BWC) of less than 10 ASTM BWC, an apparent density above 0.35 $g/cm^3$, and micropores in an amount less than 0.5 $cm^3/g$ and having a specific surface area of less than 600 $m^2/g$, micropores being pores having a size of less than 2 nm,
   wherein the second adsorbent material is different than the first adsorbent material; and
   wherein liquid fuel that enters the internal volume of the casing via the inlet is adsorbed by the first adsorbent material, and the first adsorbent material protects the second adsorbent material from the structural damage and functional degradation caused by the liquid fuel.

2. The evaporative emissions canister of claim 1, wherein the second adsorbent material is not resistant to structural damage or functional degradation caused by liquid fuel, the structural damage being cracking, and the functional degradation being reduced fuel vapor adsorption capacity.

3. The evaporative emissions canister of claim 1, wherein: (i) the bed of first adsorbent material contacts the bed of second adsorbent material; or (ii) the bed of first adsorbent material is spaced from the bed of second adsorbent material.

* * * * *